United States Patent
Cirulli et al.

(10) Patent No.: US 7,895,133 B2
(45) Date of Patent: Feb. 22, 2011

(54) PRICING METHOD AND SYSTEM

(75) Inventors: Susan Bumgardner Cirulli, Simpsonville, SC (US); Gautam Majumdar, Wappingers Falls, NY (US); Michael Randy May, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 11/697,882

(22) Filed: Apr. 9, 2007

(65) Prior Publication Data

US 2008/0247887 A1 Oct. 9, 2008

(51) Int. Cl.
*G06F 17/00* (2006.01)

(52) U.S. Cl. ..................................... 705/400
(58) Field of Classification Search ................... 705/400
See application file for complete search history.

(56) References Cited

U.S. PATENT DOCUMENTS

| | | | |
|---|---|---|---|
| 5,117,353 A * | 5/1992 | Stipanovich et al. | 705/11 |
| 5,164,897 A | 11/1992 | Clark et al. | |
| 6,311,164 B1 | 10/2001 | Ogden | |
| 6,381,592 B1 | 4/2002 | Reuning | |
| 6,662,194 B1 | 12/2003 | Joao | |
| 6,859,523 B1 | 2/2005 | Jilk et al. | |
| 2001/0032229 A1 * | 10/2001 | Hulls et al. | 709/101 |
| 2003/0120526 A1 * | 6/2003 | Altman et al. | 705/5 |
| 2004/0267606 A1 * | 12/2004 | Brishke et al. | 705/11 |
| 2005/0010467 A1 * | 1/2005 | Dietz et al. | 705/9 |
| 2006/0064317 A1 * | 3/2006 | Feygenson et al. | 705/1 |

OTHER PUBLICATIONS

Freeman, Diane, "High-Tech Temps Get Top Pay," Rocky Mountain News, Final Edition, Denver, Colorado, Oct. 4, 1998, p. 1.J.*

* cited by examiner

*Primary Examiner*—John W Hayes
*Assistant Examiner*—Nathan Erb
(74) *Attorney, Agent, or Firm*—Schmeiser, Olsen & Watts; William E. Schiesser

(57) ABSTRACT

A pricing method and system. The method includes receiving, by a computing system, data associated with a business. The data comprises a first list of negotiated pricing rates and associated skills, a second list of requesters, and a third list of suppliers. The computing system receives business factors data. The computing system determines requester options with respect to the negotiated pricing rates. The requester options are dependent on the business factors data. The computing system determines supplier options with respect to the negotiated pricing rates. The supplier options are dependent on the business factors data. The computing system determines sourcing buyer authorization options with respect to suppliers and the negotiated pricing rates. The computing system generates a pricing report comprising the requester options, the supplier options, the sourcing buyer authorization options, and the business factors data.

16 Claims, 3 Drawing Sheets

PRICING METHOD AND SYSTEM

FIELD OF THE INVENTION

The present invention relates to a method and associated system for configuring pricing rates.

BACKGROUND OF THE INVENTION

Configuring compensation for individuals within an organization typically comprises an inefficient process with little flexibility. In diverse organizations, competition for individuals is great and therefore compensation for the individuals should be configured accordingly. Configuring a compensation package with respect to competition for individuals may comprise a complicated and time consuming process. Accordingly, there exists a need in the art to overcome at least one of the deficiencies and limitations described herein above.

SUMMARY OF THE INVENTION

The present invention provides a pricing method comprising:

receiving, by a computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills, said computing system comprising a memory device;

storing, by said computing system, said first pricing data in said memory device;

receiving, by said computing system, business factors data, said business factors data comprising a plurality of business factors;

determining, by said computing system for said requesters, requester options with respect to said negotiated pricing rates, said requester options dependent on said business factors data;

determining, by said computing system for said suppliers, supplier options with respect to said negotiated pricing rates, said supplier options dependent on said business factors data;

determining, by said computing system for sourcing buyers, sourcing buyer authorization options with respect to said suppliers and said negotiated pricing rates; and generating, by said computing system, a pricing report comprising said requester options, said supplier options, said sourcing buyer authorization options, and said business factors data.

The present invention provides a computing system comprising a processor coupled to a computer-readable memory unit, said memory unit comprising instructions that when executed by the processor implement a pricing method, said method comprising:

receiving, by said computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills;

storing, by said computing system, said first pricing data in said memory unit;

receiving, by said computing system, business factors data, said business factors data comprising a plurality of business factors;

determining, by said computing system for said requesters, requester options with respect to said negotiated pricing rates, said requester options dependent on said business factors data;

determining, by said computing system for said suppliers, supplier options with respect to said negotiated pricing rates, said supplier options dependent on said business factors data;

determining, by said computing system for sourcing buyers, sourcing buyer authorization options with respect to said suppliers and said negotiated pricing rates; and generating, by said computing system, a pricing report comprising said requester options, said supplier options, said sourcing buyer authorization options, and said business factors data.

The present invention provides a computer program product, comprising a computer usable medium comprising a computer readable program code embodied therein, said computer readable program code adapted to implement a pricing method within a computing system, said method comprising:

receiving, by said computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills;

storing, by said computing system, said first pricing data in said computer usable medium;

receiving, by said computing system, business factors data, said business factors data comprising a plurality of business factors;

determining, by said computing system for said requesters, requester options with respect to said negotiated pricing rates, said requester options dependent on said business factors data;

determining, by said computing system for said suppliers, supplier options with respect to said negotiated pricing rates, said supplier options dependent on said business factors data;

determining, by said computing system for sourcing buyers, sourcing buyer authorization options with respect to said suppliers and said negotiated pricing rates; and generating, by said computing system, a pricing report comprising said requester options, said supplier options, said sourcing buyer authorization options, and said business factors data.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a pricing method, said method comprising:

receiving, by said computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills, said computing system comprising a memory device;

storing, by said computing system, said first pricing data in said memory device;

receiving, by said computing system, business factors data, said business factors data comprising a plurality of business factors;

determining, by said computing system for said requesters, requester options with respect to said negotiated pricing rates, said requester options dependent on said business factors data;

determining, by said computing system for said suppliers, supplier options with respect to said negotiated pricing rates, said supplier options dependent on said business factors data;

determining, by said computing system for sourcing buyers, sourcing buyer authorization options with respect to said suppliers and said negotiated pricing rates; and generating, by said computing system, a pricing report comprising said requester options, said supplier options, said sourcing buyer authorization options, and said business factors data.

The present invention advantageously provides a method and associated system capable of configuring compensation for individuals within an organization.

DETAILED DESCRIPTION OF THE INVENTION

Figure 1:
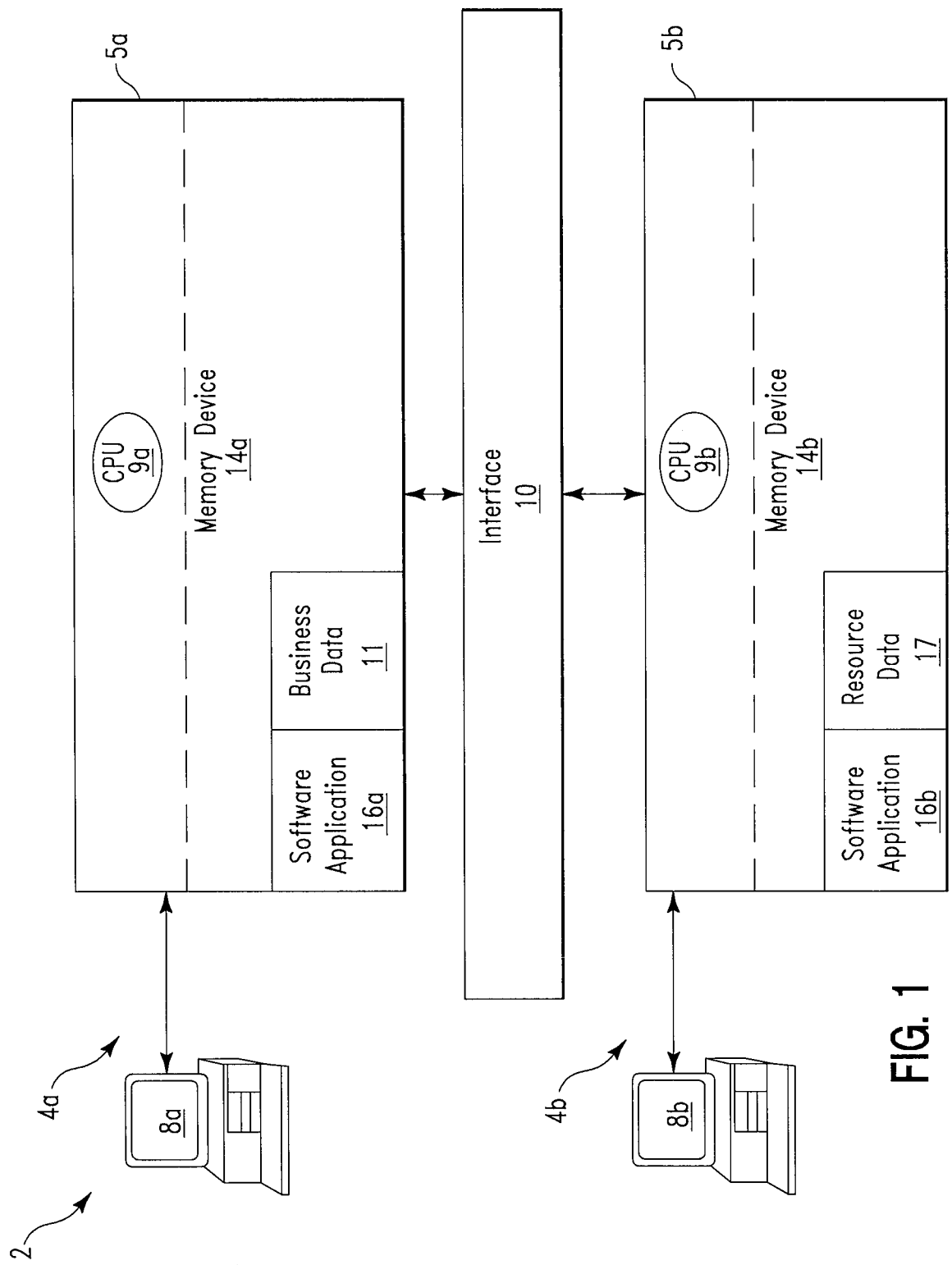
FIG. 1 illustrates a block diagram of a system for configuring pricing rates for contract employees, in accordance with embodiments of the present invention.

FIG. 1 illustrates a block diagram of a system 2 for configuring pricing rates for contract employees, in accordance with embodiments of the present invention. System 2 may be used in any business process including, inter alia, allowing a user (e.g., a requester using terminal 8a) to specify whether a supplier (e.g., an employment agency) may modify pricing rates paid to themselves for providing contractor employees (i.e., resources comprising specified skill sets). Additionally, system 2 may be used in any business process including, inter alia, allowing a user (e.g., a requester or sourcing buyer using terminal 8a) to modify pricing rates paid to suppliers (e.g., an employment agency) for providing contractor employees (i.e., resources comprising specified skill sets). A requester is defined herein as a person/people (e.g., users from an entity such as, inter alia, an organization) looking for a resource (i.e., a person/people with a specific skill(s)) to fill an open job position. A resource will perform job functions for a requesting organization. The resource is actually an employee of the supplier so therefore the supplier is paid a bill rate (i.e., an amount of money paid to the supplier of resource by the requesting organization which requested the resource to work on a service contract held by the requesting organization) by the requesting organization and the resource is paid a wage rate (i.e., a monetary rate paid to a resource working on a service contract held by a requesting organization) by the supplier. The requester interacts with a software application (e.g., software application 16a) to select a specified candidate skill set (e.g., inter alia, a Java programmer, etc) related to a job opening and generate a request (i.e., for a resource comprising the specified candidate skill set) to a supplier(s) for providing the resource. In response to the request, the software application (e.g., software application 16a) allows the requester to specify that any supplier may use a negotiated rate or an exception pricing rate (i.e., with certain limitations based on business factors data 11 comprising service type data, request type data, and global resource designation data) with respect to paying the supplier for a resource that will be hired. Service type data comprises data specifying a category comprising a group of similar skills. Global resource designation data comprises data specifying different pay rate scales for different countries. Request type data comprises information specifying a type of request for a skill (e.g., new request, renewal request, referral request, etc). A negotiated rate is defined herein as a pay rate that is determined when a requesting organization (i.e., an organization that makes requests for resources necessary to successfully complete a mission or project within the organization) enters into an agreement with a supplier of skilled individuals (i.e., resources). The agreement will specify a rate the requesting organization will pay to the supplier for a resource that poses a desired skill or skill set at a specified experience level. Exception pricing is defined herein as a pay rate that is determined when a supplier responds with a resource for a requested position to the requesting company and the supplier indicates to the requesting company that the supplier requests to be paid more than the negotiated rate for providing the resource. Exception pricing may take into account several factors including, inter alia, bill rate, wage rate, a markup between a bill rate and a wage rate, a percentage markup between a bill rate and a wage rate, etc. A flat markup is a mathematical difference between bill rate and a wage rate. For example, if the requesting organization is paying the supplier $10.00 and the supplier is paying the resource $8.00, then the markup is $2.00. The markup is not sensitive to a magnitude of the bill rate. For example, an $8.00 difference between a $10.00 bill rate and a $2.00 wage rate is more significant than a same $8.00 difference between a bill rate of $85 and a wage rate of $72.00. Percentage markup is calculated as a mathematical quotient between a bill rate and a wage rate. For example, if the requesting organization is paying the supplier $10.00 and the supplier is paying the resource $8.00, then the percentage markup is 10.00/8.00 or 1.25. The $2.00 retained by the supplier is 25% of the resources' wage. Percentage markup is sensitive to the magnitude of the bill rate. For example, an $8.00 difference between a $10.00 bill rate and a $2.00 wage has a percentage markup of 5, where the same $8.00 difference between a bill rate of $85 and a wage of $72.00 results in a percentage markup 1.18.

System 2 comprises a computing system 4a (e.g., a server) connected to a computing system 4b (e.g., a server) through an interface 10. Interface 10 may comprise any type of interface known to a person of ordinary skill in the art including, inter alia, a local area network, (LAN), a wide area network (WAN), the Internet, etc. Computing system 4a comprises a computing apparatus 5a and an interface terminal 8a. Computing system 4b comprises a computing apparatus 5b and an interface terminal 8b. Computing apparatus 5a comprises a CPU 9a and a memory device 14a. Alternatively, memory device 14a may be located external to computing apparatus 5a. Memory device 14a comprises a software application 16a and business data 11. Business data 11 may be inputted into computing apparatus through interface terminal 8a. Business data 11 comprises a list of requesters, a list of suppliers, a list of sourcing buyers, a list of negotiated pricing rates for skills or resources, and business factors data. Computing apparatus 5b comprises a CPU 9b and a memory device 14b. Alternatively, memory device 14b may be located external to computing apparatus 5b. Memory device 14b comprises a software application 16b and resource data 17. Resource data 17 may be inputted into computing apparatus through interface terminal 8b. Resource data 17 (i.e., comprising lists of resources for performing specified skills) may be inputted into computing apparatus 5b through interface terminal 8b.

Software application 16a and 16b may be configured to generate different pricing control options that determine a pricing flexibility (i.e., with respect to resources) for a requester and a supplier. The following six examples describe different pricing control configuration options for software application 16a and 16b.

Option 1

Option 1 (i.e., illustrating pricing control configuration options) allows software application 16a and 16b to be configured to restrict a requester at a requesting (i.e., for a resource) company and a supplier of a requested resource from deviating from negotiated rates configured for the requester and supplier.

1. Requester options for deviating from negotiated rates:

None.

2. Supplier options for negotiated rates and exception rates:

Negotiated Rates
   Bill Rate Options
     The supplier may only respond to the requesting company with resources where the supplier will be paid by the requesting company based on bill rates that are at or below the negotiated straight time rate.
   Wage Rate Options
     Not applicable.
   Markup Tolerance
     None, since a wage rate is not provided in the response from the supplier.

Exception Rates
   Not applicable

3. Sourcing buyer authorization options:

The supplier is prevented from submitting a response that would require a sourcing buyer to authorize.

Option 2

Option 2 (i.e., illustrating pricing control configuration options) allows software application 16a and 16b to be configured to restrict a requester at the requesting company and a supplier of a requested skilled resource from deviating from negotiated rates configured for the requester and supplier. The requester ensures that the supplier is paying the resource an acceptable wage in comparison to the bill rate being paid to the supplier.

1. Requester options for deviating from negotiated rates:

None

2. Supplier options for deviating from negotiated rates:

Negotiated Rates
   Bill Rate Options
     The supplier may only respond to the requesting company with resources where the supplier will be paid by the requesting company based on bill rates that are at or below the negotiated straight time rate.
   Wage Rate Options
     As part of internal business practices of an organization within the requesting company, an amount of money that will be paid to the individual (i.e., wage rate) by the supplier must be provided to the requesting company.
   Markup Tolerance
     A markup tolerance is configured. The markup tolerance specifies a maximum difference/quotient between bill rates and wage rates applied to resources.

Exception Rates:
   Not applicable.

3. Sourcing buyer authorization options:

The supplier is prevented from submitting a response that would require a sourcing buyer to authorize.

Option 3

Option 3 (i.e., illustrating pricing control configuration options) allows software application 16a and 16b to be configured to allow flexibility to both a requester and a supplier. The requester may allow the supplier to respond with resources that are above the negotiated rate. The supplier may provide responses that are out of markup tolerance. A sourcing buyer will review each response that is out of markup tolerance or is above a negotiated bill rate.

1. Requester options for deviating from negotiated rates:

A requester may control if a supplier will be allowed to provide responses that comprise exception pricing.

2. Supplier options for deviating from negotiated rates:

Negotiated Rates
   Bill Rate Options
     The supplier may only respond to the requesting company with resources where the supplier will be paid by the requesting company based on bill rates that are at or below a negotiated straight time rate.
   Wage Rate Options
     As part of internal business practices of an organization within the requesting company, an amount of money that will be paid to the individual (i.e., wage rate) by the supplier must be provided to the requesting company.
   Markup Tolerance
     A markup tolerance is configured. The markup tolerance specifies a maximum difference/quotient between bill rates and wage rates applied to resources.

Exception Rates:
   Bill Rate Options
     The supplier may only respond to the requesting company with resources where the supplier will be paid by the requesting company based on bill rates that are above the negotiated straight time rate.
   Wage Rate Options
     As part of internal business practices of an organization within the requesting company, an amount of money that will be paid to the individual (i.e., wage rate) by the supplier must be provided to the requesting company.
   Markup Tolerance
     A markup tolerance is configured. The markup tolerance specifies a maximum difference/quotient between bill rates and wage rates applied to resources.

3. Sourcing buyer authorization options:

Since a bill rate entered by the supplier is allowed to exceed a negotiated bill rate and the calculated markup tolerance is allowed to exceed configured markup tolerances, the sourcing buyer will authorize any response where any one of the following is true:

A. The supplier entered a bill rate (i.e., exception rate) that is above a negotiated rate.
   B. A calculated straight time markup is above a configured straight time bill rate markup tolerance.
   C. A calculated overtime markup is above a configured overtime markup tolerance.

Option 4

Option 4 (i.e., illustrating pricing control configuration options) allows software application 16a and 16b to be configured to allow flexibility to both a requester and a supplier. The requester may allow the supplier to respond with resources that are above the negotiated rate. The supplier may provide responses that are out of markup tolerance. A sourcing buyer will review each response that is out of markup tolerance or is above a negotiated bill rate.

1. Requester options for deviating from negotiated rates:

A requester may control if a supplier will be allowed to provide responses that comprise exception pricing.

2. Supplier options for deviating from negotiated rates:

Negotiated Rates
  Bill Rate Options
    The supplier may only respond to the requesting company with resources where the supplier will be paid by the requesting company based on bill rates that are at or below a negotiated straight time rate.
  Wage Rate Options
  Not applicable.
  Markup Tolerance
    None, because there is no wage rate options.

Exception Rates:
  Bill Rate Options
    The supplier may only respond to the requesting company with resources where the supplier will be paid by the requesting company based on bill rates that are above the negotiated straight time rate.
  Wage Rate Options
    As part of internal business practices of an organization within the requesting company, an amount of money that will be paid to the individual (i.e., wage rate) by the supplier must be provided to the requesting company.
  Markup Tolerance
    A markup tolerance is configured. The markup tolerance specifies a maximum difference/quotient between bill rates and wage rates applied to resources.

3. Sourcing buyer authorization options:

Since a bill rate entered by the supplier is allowed to exceed a negotiated bill rate and the calculated markup tolerance is allowed to exceed configured markup tolerances, the sourcing buyer will authorize any response where any one of the following is true:
  A. The supplier entered a bill rate (i.e., exception rate) is above a negotiated rate.
  B. A calculated markup is above a configured bill rate markup tolerance.
  C. A calculated overtime markup for a bill rate is above a configured markup tolerance.

Option 5

Option 5 (i.e., illustrating pricing control configuration options) allows software application 16a and 16b to be configured to allow flexibility to both a requester and a supplier. A sourcing buyer will review each response that is above a negotiated bill rate.

1. Requester options for deviating from negotiated rates:

A requester may control if a supplier will be allowed to provide responses that comprise exception pricing.

2. Supplier options for deviating from negotiated rates:

Negotiated Rates
  Bill Rate Options
    The supplier may only respond to the requesting company with resources where the supplier will be paid by the requesting company based on bill rates that are at or below a negotiated straight time rate.
  Wage Rate Options
  Not applicable.
  Markup Tolerance
    None, because there is no wage rate options.

Exception Rates:
  Bill Rate Options
    The supplier may only respond to the requesting company with resources where the supplier will be paid by the requesting company based on bill rates that are above the negotiated straight time rate.
  Wage Rate Options
  Not applicable.
  Markup Tolerance
    None, because there is no wage rate options.

3. Sourcing buyer authorization options:

Since a bill rate entered by the supplier is allowed to exceed a negotiated bill rate, the sourcing buyer will authorize any response where any one of the following is true:
  A. The supplier entered a bill rate (i.e., exception rate) is above a negotiated rate.

Option 6

Option 6 (i.e., illustrating pricing control configuration options) allows software application 16a and 16b to be configured to allow flexibility to both a requester and a supplier. The requester may allow the supplier to respond with resources that are above the negotiated rate. The requester ensures that the supplier is paying a resource an acceptable wage rate in comparison to a bill rate being paid to the supplier.

1. Requester options for deviating from negotiated rates:

A requester may control if a supplier will be allowed to provide responses that comprise exception pricing.

2. Supplier options for deviating from negotiated rates:

Negotiated Rates
  Bill Rate Options
    The supplier may only respond to the requesting company with resources where the supplier will be paid by the requesting company based on bill rates that are at or below a negotiated straight time rate.
  Wage Rate Options
  Not applicable.
  Markup Tolerance
    None, because there is no wage rate options.

Exception Rates:
  Bill Rate Options
    The supplier may only respond to the requesting company with resources where the supplier will be paid by the requesting company based on bill rates that are above the negotiated straight time rate.
  Wage Rate Options
    As part of internal business practices of an organization within the requesting company, an amount of money that will be paid to the individual (i.e., wage rate) by the supplier must be provided to the requesting company.
  Markup Tolerance
    The markup is calculated. The calculated straight time markup and overtime markup are compared to a configured straight time markup tolerance and overtime markup tolerance. The calculated straight time markup can not be above the configured straight time markup tolerance and the calculated overtime markup can not be above the configured overtime markup tolerance.

3. Sourcing buyer authorization options:

Since a bill rate entered by the supplier is allowed to exceed a negotiated bill rate but the software application prevents the supplier from entering a wage rate that would cause a calculated markup to exceed a configured markup tolerance, the sourcing buyer at the requesting company will authorize a supplier response comprising entering a straight time bill rate is above the negotiated rate.

A report (e.g., see table 1 as described with reference to FIG. 2, infra) may be generated comprising the aforementioned options (i.e., options 1-6) and/or configured pricing rates (e.g., negotiated rate and/or exception pricing rates) for contract employees. The report may be printed, sent in an email, displayed on interface terminal 8a and/or interface terminal 8b, stored in memory device 14a and/or 14b, etc.

Figure 2:
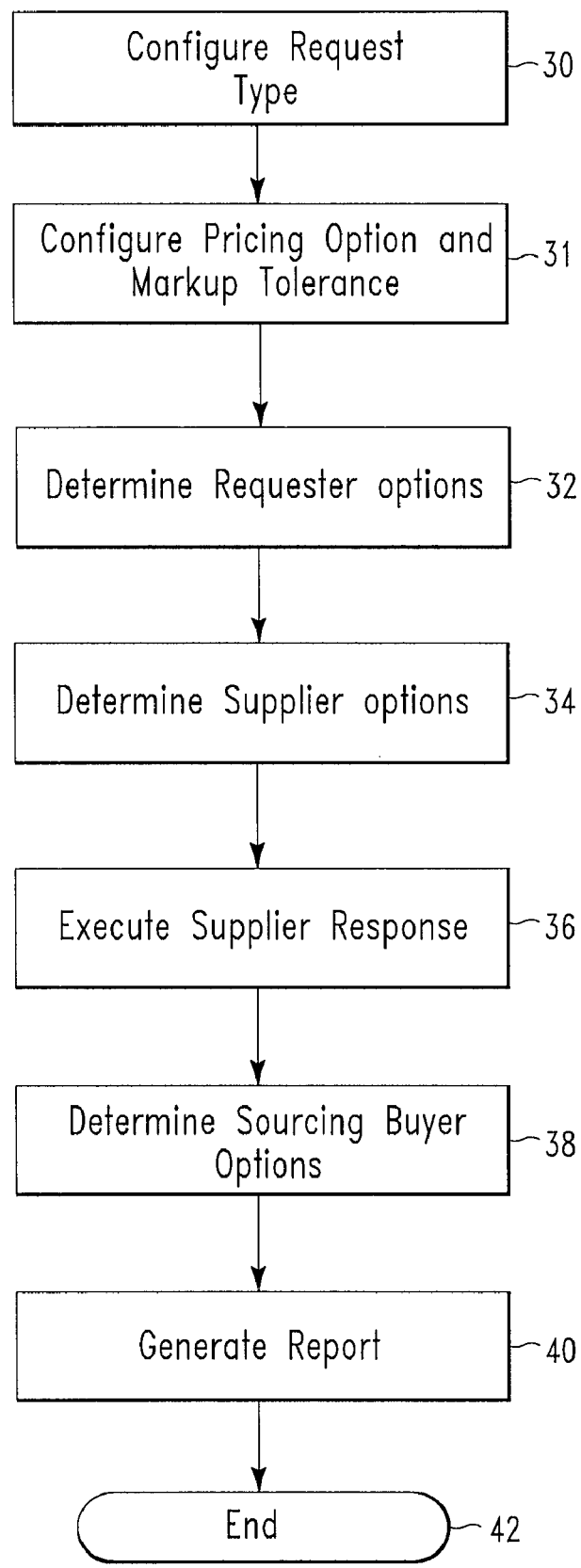
FIG. 2 illustrates a flowchart describing an algorithm used by the system of FIG. 1 for configuring pricing rates for contract employees, in accordance with embodiments of the present invention.

FIG. 2 illustrates a flowchart describing an algorithm used by system 2 of FIG. 1 for configuring pricing rates for contract employees, in accordance with embodiments of the present invention. In step 30, a resource request type is configured. A resource request type may be selected from the following types:
1. New request—This is a new position at a requesting company. The position may be filled by any qualified individual.
2. Renewal request—An employee (i.e., a resource) of the supplier is already working for the requesting company and the requesting company is asking that this individual be extended.
3. Referral request—This is a new position at the requesting company. The requesting company is specifying that a specified resource fill the open position.

In step 31, a pricing option and markup tolerance is configured. As part of deploying software application 16a and 16b, a requesting organization needs to configure pricing options and markup tolerances. The pricing options and markup tolerance are specific to the following characteristics of a request item:
1. Service type
2. Global resource designation
3. Request type
4. Requesting organization
5. Supplier For each combination of the above characteristics, the following pricing options are specified:

1. The pricing option to be enforced on the supplier if the requester has indicted no exception pricing rates.
2. The pricing option to be enforced on the supplier if the requester has indicted exception pricing.

If values for the two pricing options are equal and the specified pricing option is configured to be a no exception pricing rates method, then the requester will not be asked if the supplier is allowed to specify pricing rate that is above a negotiated pricing rate. The supplier will not be allowed to enter a pricing rate that is above a negotiated pricing rate.

If values for the two pricing options are equal, and the specified pricing option is configured to be an exception pricing rates method, then the requester is not be asked if the supplier is allowed to enter a pricing rate that is above a negotiated pricing rate. The supplier will be allowed to enter a pricing rate that is above a negotiated pricing rate.

If values for the two pricing options are not equal, then the requester is asked if the supplier is allowed to enter a pricing rate that is above a negotiated pricing rate. If the requester indicates no, then the supplier will not be able to enter a pricing rate that is above a negotiated pricing rate. If the requester indicates yes, then the supplier will be able to enter a pricing rate that is above a negotiated pricing rate.

USAGE EXAMPLE 1

As an example, software application 16a and 16b is going to be deployed for use by Company A in India. Department A in Company A (i.e., in India) handles the following two types of business:
1. Performs information technology services for companies resident in India. When this is the case, a service request would not be designated as a global resource request.
2. Performs as an information technology services sub-contractor to Company A in the United States and Company A in Great Britain. When resources are needed on these engagements, the service requests raised by India requesters will be designated as a global resource request.

Table 1 below illustrates a sample pricing option and markup tolerance configuration (i.e., using options 1-6 from the description of FIG. 1) for usage example 1. A report comprising table 1 may be generated for a requester, a supplier, a sourcing buyer, etc.

TABLE 1

| Service Type | Global resource | Request type | Request Dept | Supplier | Non exception price method | Exception price method | Straight time markup tolerance | Overtime markup tolerance |
| --- | --- | --- | --- | --- | --- | --- | --- | --- |
| IndiaTech Services | No | New | | | Option 1 | Option 1 | 1.17 | 1.11 |
| IndiaTech Services | Yes | New | | | Option 2 | Option 2 | 1.17 | 1.11 |
| IndiaTech Services | No | Renewal | | | Option 2 | Option 4 | 1.17 | 1.11 |
| IndiaTech Services | Yes | Renewal | | | Option 1 | Option 5 | 1.17 | 1.11 |
| IndiaTech Services | No | Referral | | | Option 2 | Option 5 | 1.17 | 1.11 |
| IndiaTech Services | Yes | Referral | | | Option 2 | Option 5 | 1.17 | 1.11 |
| IndiaTech Services | No | New | India IGS | X | Option 6 | Option 6 | 4.00 | 6.00 |
| IndiaTech Services | Yes | New | India Outsourcing | X | Option 2 | Option 5 | 1.19 | 1.12 |
| IndiaTech Services | Yes | New | India Tech Center | X | Option 1 | Option 5 | 5.00 | 7.50 |

TABLE 1-continued

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | India BTO | X | Option 2 | Option 3 | 1.19 | 1.12 |
| IndiaTech Services | No | New | India Engineer Design | X | Option 1 | Option 6 | 1.19 | 1.12 |

In step 32, requester options are determined. For each service request item that is created it must be determined if the supplier will be allowed to respond with exception bill rates that are above the negotiated bill rates. In order to accomplish this, the following sequence occurs:

1. For the service type/request type/global resource designation combination, a pricing option configuration is checked.
2. If all configuration rows (e.g., from table 1) have equal values for non exception price method and exception price method, then the requester does not have to designate if exception pricing from the supplier will be allowed. The fact that a supplier can or can not do exception pricing is determined entirely by the configuration put in place by the supporting procurement organization.
3. If at least one configuration row (e.g., from table 1) does not comprise equal values for non exception price method and exception price method, then the requester does have to designate if exception pricing from the supplier will be allowed.

USAGE EXAMPLE 2

With respect to a service request item that comprises a service type of "Tech services", the request is of type "New", the request is not designated as a "Global resource" and the requesting department is "India IGS". The following table 2 would be in a results set. Since both have equal values for non exception price method and exception price method, the requester would not have to designate if exception pricing rates are allowed by the supplier.

TABLE 2

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | | | Option 1 | Option 1 | 1.17 | 1.11 |
| IndiaTech Services | No | New | India IGS | X | Option 6 | Option 6 | 4.00 | 6.00 |

With respect to a service request item that comprises a service type of "Tech services", the request is of type "New", the request is not designated as a "Global resource" and the requesting department is "India BTO". The following table 3 would be in the results set. Since at least one row has unequal values for non exception price method and exception price method (i.e., row 2), the request will be asked if the supplier is allowed to respond with prices above the negotiated rate.

TABLE 3

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | | | Option 1 | Option 1 | 1.17 | 1.11 |
| IndiaTech Services | No | New | India BTO | X | Option 2 | Option 3 | 1.19 | 1.12 |

In step 34, a pricing method is conveyed to the supplier(s). At various times in a service request item's processing life cycle, a list of suppliers whom may respond to the request item is maintained. For each of the suppliers that will be invited to respond to the service request item, their configured pricing method and markup information has to be determined. The pricing option and markup tolerance configuration table is read in the following sequence to determine which row from the configuration should be used for a specific supplier in the list. The order of processing is:

1. Service Type, Global resource, Request type, Requesting organization, Supplier (all specified). If a pricing option and markup tolerance row exists which matches all of these characteristics of a service request item, then the pricing option and markup tolerances from this row will be enforced on the supplier. Finding configuration for all of these inputs implies that the pricing option and its markup tolerances are specific to this supplier for the requesting organization.

2. Service Type, Global resource, Request type, Requesting organization (supplier-blank). If there is no row found with the first attempt, then the configuration is read with one less input argument, the supplier. If a pricing option and markup tolerance row exists which matches these characteristics of a service request item, then the pricing option and markup tolerances from this row will be enforced on the supplier. Finding configuration for these inputs implies that the pricing option and its markup tolerances are specific only to the requesting organization.

3. Service Type, Global resource, Request type (supplier, business unit-blank). If there is no row found with the second attempt, then the configuration is read without the supplier and requesting organization. A pricing option and markup tolerance row must exist which matches these characteristics of a service request item. The pricing option and markup tolerances from this row will be enforced on the supplier. Finding configuration for these inputs implies that the pricing option and its markup tolerances are the default for service request items that have the same service type, global resource and request type.

Within the pricing option configuration is the pricing method to be used if exception pricing rates are not allowed and the pricing method to be used if exception pricing is allowed by the supplier. Only the appropriate pricing method is conveyed to the supplier. In the previous execution step, the exception pricing question was asked of the requester. If the question is not asked, then the configuration indicates that the pricing method configured is the same for non exception pricing as it is for exception pricing. When the configuration does not have equal pricing methods for non exception and exception pricing, then the requester designates for a specific item if exception pricing is allowed. That designation is used to convey either the non exception or exception pricing method to a supplier for this service request item.

USAGE EXAMPLE 3

With respect to a service request item that comprises a service type of "Tech services", the request is of type "New", the request is not designated as a "Global resource" and the requesting department is "India IGS". The following table 4 and table 5 will be sent to suppliers X and Y, respectively. In table 4, the requester was not asked if exception pricing is allowed. The following pricing method and markup values in table 4 were given to supplier X.

TABLE 4

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | India IGS | X | Option 6 | | 4.00 | 6.00 |

The following pricing method and markup values in table 5 were given to supplier X.

TABLE 5

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | | | Option 1 | | 1.17 | 1.11 |

USAGE EXAMPLE 3

With respect to a service request item that comprises a service type of "Tech services", the request is of type "New", the request is not designated as a "Global resource" and the requesting department is "India BTO". The following table 6 and table 7 will be sent to suppliers X and Y, respectively. The requester was asked if exception pricing is allowed and the requester answered yes. The following pricing method and markup values in table 6 were given to supplier X.

TABLE 6

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | India BTO | X | | Option 3 | 1.19 | 1.12 |

The following pricing method and markup values in table 7 were given to supplier Y.

TABLE 7

| Service Type | Global resource | Request type | Request Dept | Supplier | Non exception price method | Exception price method | Straight time markup tolerance | Overtime markup tolerance |
|---|---|---|---|---|---|---|---|---|
| IndiaTech Services | No | New | | | | Option 1 | 1.17 | 1.11 |

In step 36, supplier responses are executed. When a supplier prepares a response to an item, the supplier will be governed by the pricing option within the requesting organizations configuration.

USAGE EXAMPLE 4

With respect to a service request item that comprises a service type of "Tech services", the request is of type "New", the request is not designated as a "Global resource" and the requesting department is "India IGS". Therefore, option 6 response processing is executed for supplier X and option 1 response processing is executed for supplier Y.

USAGE EXAMPLE 5

With respect to a service request item that comprises a service type of "Tech services", the request is of type "New", the request is not designated as a "Global resource" and the requesting organization is "India BTO". Therefore, option 3 response processing is executed for supplier X and option 1 response processing is executed for supplier Y.

In step 38, sourcing buyer options are determined.

USAGE EXAMPLE 6

With respect to a service request item that comprises a service type of "Tech services", the request is of type "New", the request is not designated as a "Global resource" and the requesting organization is "India IGS". Therefore, option 6 response processing is executed for supplier X and Option 1 processing is executed for supplier Y. Since the supplier provided a straight time rate greater than the negotiated rate, the supplier X response will be routed for authorization by a sourcing buyer. Since the audits on the response prevent a straight time rate being provided that exceeds the negotiate rate, no sourcing buyer will ever be required to authorize the supplier Y response.

USAGE EXAMPLE 7

With respect to a service request item that comprises a service type of "Tech services", the request is of type "New", the request is not designated as a "Global resource" and the requesting organization is "India BTO". Therefore, option 3 response processing is executed for supplier X and Option 1 processing is executed for supplier Y. Any one of three conditions could be present in the supplier X response. Assume supplier X entered a straight time rate that was equal to the negotiated rate, but supplier X entered straight time wage caused the calculated straight time markup to exceed the straight time markup tolerance. The supplier X response will be routed for authorization. Since the audits on the Supplier Y response prevents a straight time rate being provided that exceeds the negotiate rate, no sourcing buyer will ever be required to authorize the Supplier Y response.

In step 40, a pricing report comprising various options may be generated and in step 42, the process terminates.

Figure 3:
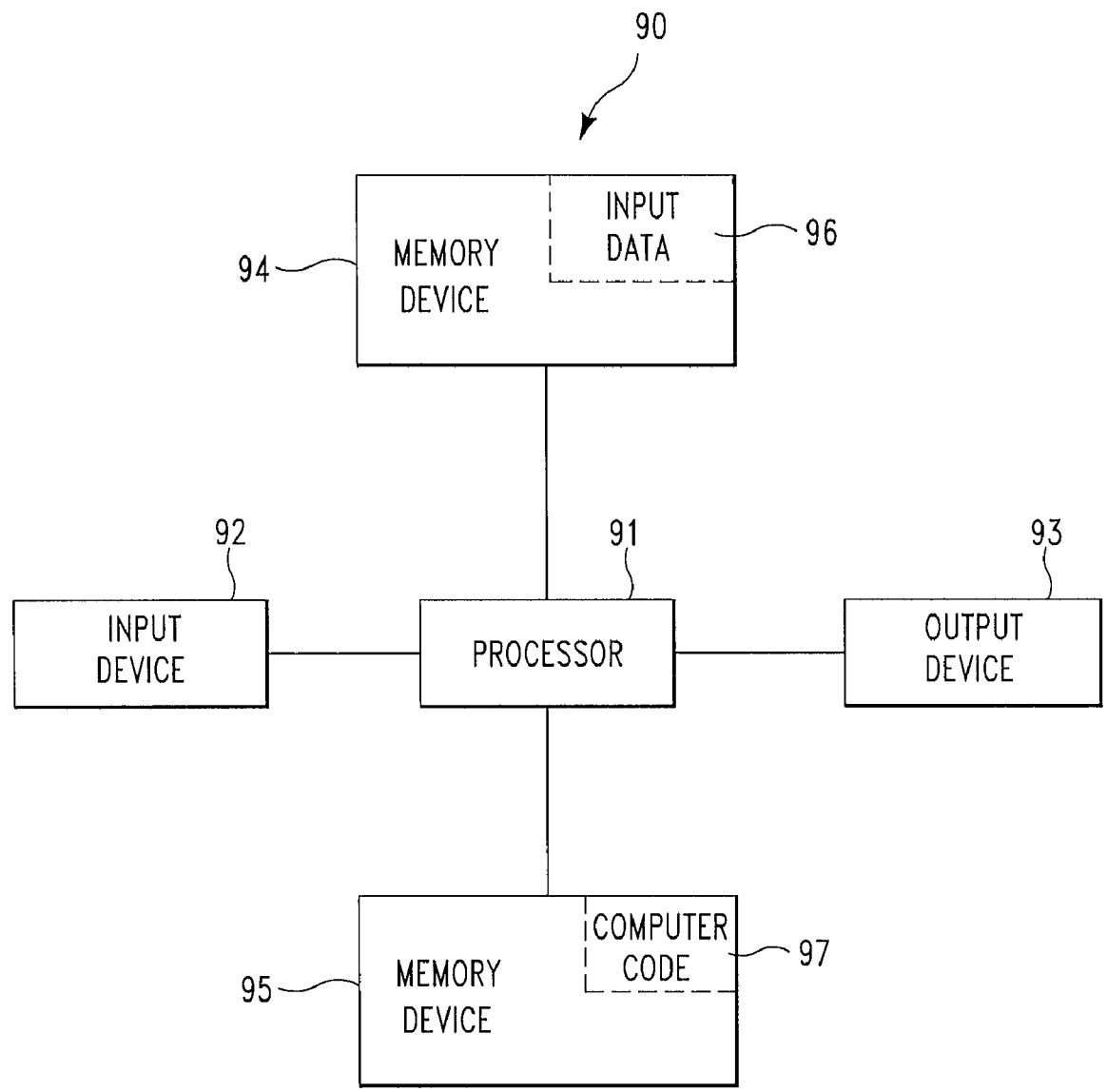
FIG. 3 illustrates the computer apparatus of FIG. 1 used for configuring pricing rates for contract employees, in accordance with embodiments of the present invention.

FIG. 3 illustrates a computer apparatus 90 (i.e., computing apparatus 5a and 5b in FIG. 1) used for configuring pricing rates for contract employees, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for configuring pricing rates for contract employees. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to configure pricing rates for contract employees. Thus the present invention discloses a process for deploying or integrating computing infrastructure, comprising integrating computer-readable code into the computer system 90, wherein the code in combination with the computer system 90 is capable of performing a method for configuring pricing rates for contract employees. In another embodiment, the invention provides a business method that performs the process steps of the invention on a subscription, advertising, and/or fee basis. That is, a service provider, such as a Solution Integrator, could offer to configure pricing rates for contract employees. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A pricing method comprising:

receiving, by a computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills, said computing system comprising a memory device;

generating, by said computing system, a markup tolerance configuration table consisting of a service type header, a global resource type header, a request type header, a request department header, a supplier header, a non exception price method header, an exception price method header, a straight time markup tolerance header, and an overtime markup tolerance header;

storing, by said computing system, said first data in said memory device;

receiving, by said computing system, business factors data, said business factors data comprising a plurality of business factors;

populating, by said computing system, said markup tolerance configuration table with said first data and said business factors data;

first determining, by said computing system, if said suppliers are authorized to specify exception rates that are greater than said negotiated pricing rates;

second determining, by said computing system for said requesters based on results of said first determining, requester options with respect to said negotiated pricing rates, said requester options dependent on said business factors data;

associating, by said computing system, specified rows of said markup tolerance configuration table with associated suppliers of said suppliers;

third determining, by said computing system for said suppliers based on said associating, supplier options with respect to said negotiated pricing rates, said supplier options dependent on said business factors data;

fourth determining, by said computing system for sourcing buyers based on said markup tolerance configuration table, sourcing buyer authorization options with respect to said suppliers and said negotiated pricing rates; and generating, by said computing system, a pricing report comprising said requester options, said supplier options, said sourcing buyer authorization options, and said business factors data;

wherein said requester options comprise a first requester option of allowing at least one requester of said requesters to enable at least one supplier of said suppliers to replace a negotiated pricing rate of said negotiated pricing rates with an exception pricing rate that comprises a higher rate from said negotiated pricing rate, wherein said supplier options comprise a supplier option of allowing at least one supplier of said suppliers to perform a transaction comprising replacing a negotiated pricing rate of said negotiated pricing rates with an exception pricing rate that exceeds a maximum specified markup tolerance provided by said markup tolerance configuration table for said suppliers, wherein said maximum specified markup tolerance specifies a maximum difference and/or quotient between said bill rates and wage rates applied to said resources, and wherein said sourcing buyer authorization options comprise a sourcing buyer option of allowing at least one sourcing buyer of said sourcing buyers to authorize said transaction.

2. The method of claim 1, wherein said business factors data comprises service type data, request type data, and global resource designation data.

3. The method of claim 1, wherein said requester options comprise a second requester option of restricting at least one requester of said requesters from deviating from said negotiated pricing rates, and wherein said supplier options comprise an option of restricting at least one supplier of said suppliers from deviating from said negotiated pricing rates.

4. The method of claim 3, wherein said requester options further comprise a third requester option of allowing said at least one requester of said requesters to specify the maximum specified markup tolerance for said suppliers.

5. The method of claim 1, further comprising:

receiving, by said computing system from said sourcing buyer, approval to perform said transaction.

6. The method of claim 1, further comprising:

providing at least one support service for at least one of creating, integrating, hosting, maintaining, and deploying computer-readable code in said computing system, wherein the code in combination with the computing system is capable of performing: said receiving first data, said generating said markup tolerance configuration table, said storing, said receiving said business factors data, said populating, said first determining, said determining said requester options, said associating, said determining said supplier options, said determining said sourcing buyer authorization options, and said generating said pricing report.

7. A computing system comprising:

a processor; and a computer-readable memory unit, coupled to said processor;

wherein said memory unit stores instructions that, when executed by the processor, implement a pricing method, said method comprising:

receiving, by said computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills;

generating, by said computing system, a markup tolerance configuration table consisting of a service type header, a global resource type header, a request type header, a request department header, a supplier header, a non exception price method header, an exception price method header, a straight time markup tolerance header, and an overtime markup tolerance header;

storing, by said computing system, said first data in said memory unit;

receiving, by said computing system, business factors data, said business factors data comprising a plurality of business factors;

populating, by said computing system, said markup tolerance configuration table with said first data and said business factors data;

first determining, by said computing system, if said suppliers are authorized to specify exception rates that are greater than said negotiated pricing rates;

second determining, by said computing system for said requesters based on results of said first determining, requester options with respect to said negotiated pricing rates, said requester options dependent on said business factors data;

associating, by said computing system, specified rows of said markup tolerance configuration table with associated suppliers of said suppliers;

third determining, by said computing system for said suppliers based on said associating, supplier options with respect to said negotiated pricing rates, said supplier options dependent on said business factors data;

fourth determining, by said computing system for sourcing buyers based on said markup tolerance configuration table, sourcing buyer authorization options with respect to said suppliers and said negotiated pricing rates; and generating, by said computing system, a pricing report comprising said requester options, said supplier options, said sourcing buyer authorization options, and said business factors data;

wherein said requester options comprise a first requester option of allowing at least one requester of said requesters to enable at least one supplier of said suppliers to replace a negotiated pricing rate of said negotiated pricing rates with an exception pricing rate that comprises a higher rate from said negotiated pricing rate, wherein said supplier options comprise a supplier option of allowing at least one supplier of said suppliers to perform a transaction comprising replacing a negotiated pricing rate of said negotiated pricing rates with an exception pricing rate that exceeds a maximum specified markup tolerance provided by said markup tolerance configuration table for said suppliers, wherein said maximum specified markup tolerance specifies a maximum difference and/or quotient between said bill rates and wage rates applied to said resources, and wherein said sourcing buyer authorization options comprise a sourcing buyer option of allowing at least one sourcing buyer of said sourcing buyers to authorize said transaction.

8. The computing system of claim 7, wherein said business factors data comprises service type data, request type data, and global resource designation data.

9. The computing system of claim 7, wherein said requester options comprise a second requester option of restricting at least one requester of said requesters from deviating from said negotiated pricing rates, and wherein said supplier options comprise an option of restricting at least one supplier of said suppliers from deviating from said negotiated pricing rates.

10. The computing system of claim 9, wherein said requester options further comprise a third requester option of allowing said at least one requester of said requesters to specify the maximum specified markup tolerance for said suppliers.

11. The computing system of claim 7, wherein said method further comprises:

receiving, by said computing system from said sourcing buyer, approval to perform said transaction.

12. A computer program product, comprising a computer usable storage medium storing a computer readable program code, said computer readable program code configured to, upon execution by a computing system, cause the computing system to implement a pricing method, said method comprising:

receiving, by said computing system, first data associated with a business, said first data comprising a first list of negotiated pricing rates and associated skills, a second list of requesters associated with said business, and a third list of suppliers, each negotiated pricing rate of said negotiated pricing rates assigned to an associated skill of said associated skills, said negotiated pricing rates specifying bill rates paid by said business to said suppliers for providing resources to perform said associated skills;

generating, by said computing system, a markup tolerance configuration table consisting of a service type header, a global resource type header, a request type header, a request department header, a supplier header, a non exception price method header, an exception price method header, a straight time markup tolerance header, and an overtime markup tolerance header;

storing, by said computing system, said first data in said computer usable storage medium;

receiving, by said computing system, business factors data, said business factors data comprising a plurality of business factors;

populating, by said computing system, said markup tolerance configuration table with said first data and said business factors data;

first determining, by said computing system, if said suppliers are authorized to specify exception rates that are greater than said negotiated pricing rates;

second determining, by said computing system for said requesters based on results of said first determining, requester options with respect to said negotiated pricing rates, said requester options dependent on said business factors data;

associating, by said computing system, specified rows of said markup tolerance configuration table with associated suppliers of said suppliers;

third determining, by said computing system for said suppliers based on said associating, supplier options with respect to said negotiated pricing rates, said supplier options dependent on said business factors data;

fourth determining, by said computing system for sourcing buyers based on said markup tolerance configuration table, sourcing buyer authorization options with respect to said suppliers and said negotiated pricing rates; and generating, by said computing system, a pricing report comprising said requester options, said supplier options, said sourcing buyer authorization options, and said business factors data;

wherein said requester options comprise a first requester option of allowing at least one requester of said requesters to enable at least one supplier of said suppliers to replace a negotiated pricing rate of said negotiated pricing rates with an exception pricing rate that comprises a higher rate from said negotiated pricing rate, wherein said supplier options comprise a supplier option of allowing at least one supplier of said suppliers to perform a transaction comprising replacing a negotiated pricing rate of said negotiated pricing rates with an exception pricing rate that exceeds a maximum specified markup tolerance provided by said markup tolerance configuration table for said suppliers, wherein said maximum specified markup tolerance specifies a maximum difference and/or quotient between said bill rates and wage rates applied to said resources, and wherein said sourcing buyer authorization options comprise a sourcing buyer option of allowing at least one sourcing buyer of said sourcing buyers to authorize said transaction.

13. The computer program product of claim 12, wherein said business factors data comprises service type data, request type data, and global resource designation data.

14. The computer program product of claim 12, wherein said requester options comprise a second requester option of restricting at least one requester of said requesters from deviating from said negotiated pricing rates, and wherein said supplier options comprise an option of restricting at least one supplier of said suppliers from deviating from said negotiated pricing rates.

15. The computer program product of claim 14, wherein said requester options further comprise a third requester option of allowing said at least one requester of said requesters to specify the maximum specified markup tolerance for said suppliers.

16. The computer program product of claim 12, wherein said method further comprises:

receiving, by said computing system from said sourcing buyer, approval to perform said transaction.

* * * * *